(12) United States Patent
Quiet

(10) Patent No.: US 6,323,699 B1
(45) Date of Patent: Nov. 27, 2001

(54) METHOD AND APPARATUS FOR VARIABLY PROVIDING AN INPUT SIGNAL

(75) Inventor: Duane G. Quiet, Hilsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/474,829

(22) Filed: Dec. 30, 1999

(51) Int. Cl.[7] ................................................ H03B 1/00
(52) U.S. Cl. .............................................. 327/108; 327/65
(58) Field of Search .................................. 327/108–120, 327/121–144, 292, 403, 407, 484, 52, 56, 65, 89; 330/252, 253

(56) References Cited

U.S. PATENT DOCUMENTS

| | | | |
|---|---|---|---|
| 5,166,635 | * 11/1992 | Shih | 330/253 |
| 5,798,660 | * 8/1998 | Cheng | 327/65 |
| 5,942,922 | * 8/1999 | Dinteman et al. | 327/108 |
| 6,028,454 | * 2/2000 | Elmasry et al. | 326/115 |
| 6,040,731 | * 3/2000 | Chen et al. | 327/359 |
| 6,137,340 | * 10/2000 | Goodel et al. | 327/401 |

* cited by examiner

Primary Examiner—Kenneth B. Wells
Assistant Examiner—Paul Dinh
(74) Attorney, Agent, or Firm—Blakely, Sokoloff, Taylor & Zafman LLP

(57) ABSTRACT

A method for variably providing an input signal includes receiving a set of complementary signals and a set of control signals. The method further includes outputting a selected one of a single-ended and a differential signal using at least one of the received complementary signals based, at least in part, on the received control signals.

13 Claims, 7 Drawing Sheets

# METHOD AND APPARATUS FOR VARIABLY PROVIDING AN INPUT SIGNAL

FIELD OF INVENTION

The present invention relates to the field of signal processing in a computer system. More specifically, the present invention relates to single-ended and differential signals.

BACKGROUND OF THE INVENTION

Circuitry to send signals between components of a digital system, such as a computer system, are well-known. One known approach for sending signals between components of such digital systems is to use a single-ended signal. However, the signal speed, or frequency, of single-ended signals is limited to certain magnitudes depending on the technology before the signals are impaired by noise. A solution to the limitations of the single-ended signal is the differential signal which allows for faster signal speeds while reducing the effects of noise at such high speeds. Noise is reduced in the differential signal because the differential signal is based on the difference between two signals, such as a clock and an inverted clock. The combination of the two signals helps to cancel some of the noise. For instance, if the two signals are routed in close proximity, both signals are likely to experience the same noise. In which case, the difference between the two signals is likely to be largely unaffected by the noise.

A drawback of using differential signals is that components of older, slower systems that use single-ended signaling cannot be used in faster systems that use differential signals. Even if selected, faster differential input circuits cannot be driven by single-ended (slower) signals. Furthermore there is no interchangeability between the two approaches, and therefore, in order to facilitate the selection between a single-ended and a differential signal, receivers on printed circuit boards needed to be physically changed.

Another drawback of current differential input signal buffers is that an external reference voltage is required utilizing external resistors and capacitors. Utilizing external resistors and capacitors for the external reference voltage can cause variability of the resistors and the capacitors.

DETAILED DESCRIPTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description will be presented using terminology commonly employed by those skilled in the art to convey the substance of their work to others skilled in the art.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1:
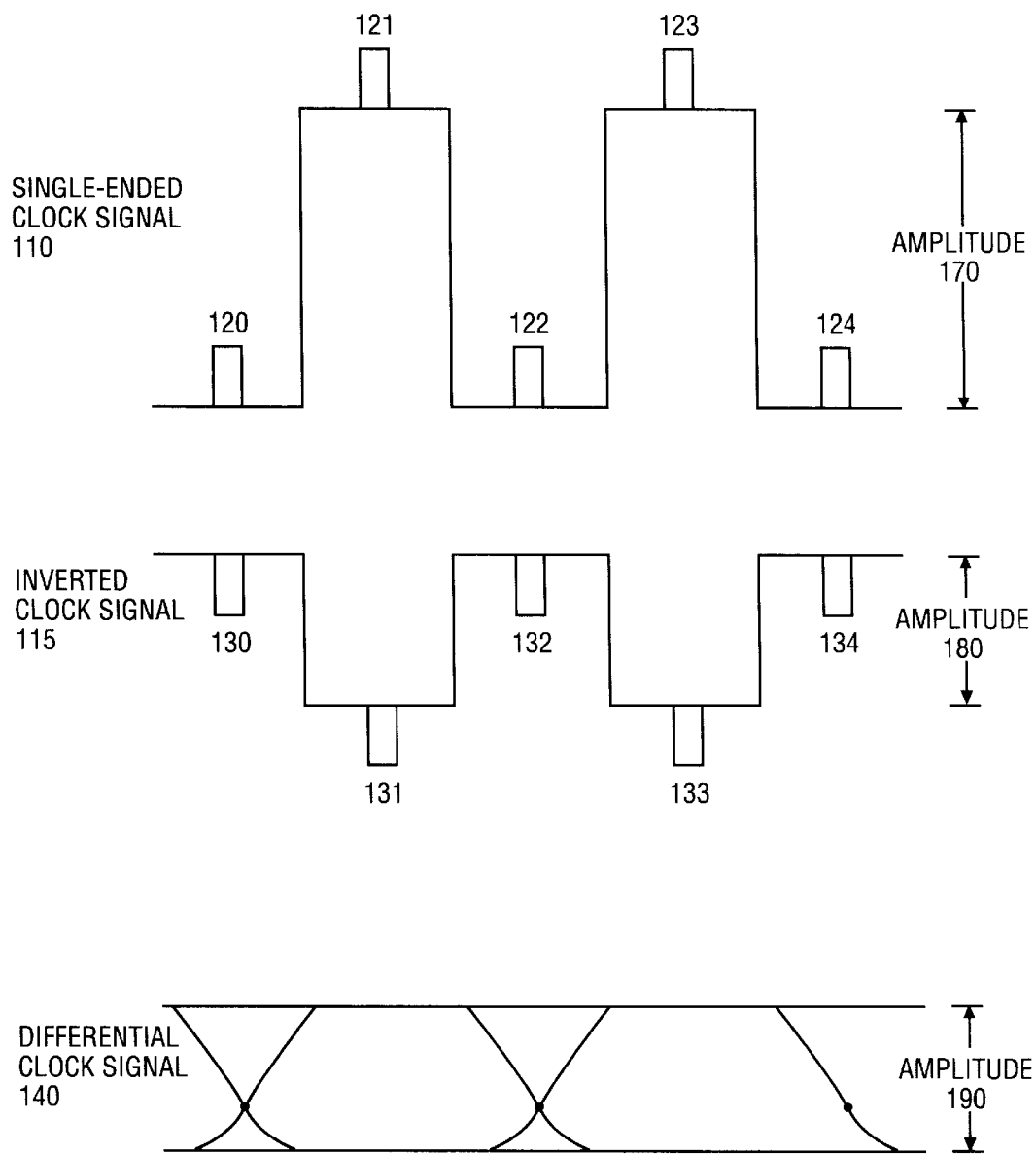
FIG. 1 illustrates one embodiment of single-ended and differential signals.

FIG. 1 illustrates one embodiment of single-ended and differential signals known in the art. In the illustrated embodiment, the signals are clock signals. The single-ended clock signal 110 having an amplitude 170 may include noise 120–124 associated with the single-ended clock signal 110. As the single-ended clock signal 110 goes to higher frequency (faster signal speed), the noise 120–124 will be more prominent. In order to send signals at a higher frequency (faster signal speed) with reduced signal noise 120–124, a single-ended clock signal 110 is differentiated with an inverted clock signal 115 having an amplitude 180 including its signal noise 130–134. The result is a differential clock signal 140 having an amplitude 190 derived from the single-ended signal amplitude 170 minus the inverted signal amplitude 180 with the amplitudes of noise 120–124 minus the amplitudes of noise 130–134 effectively canceling out the noise.

Figure 2:
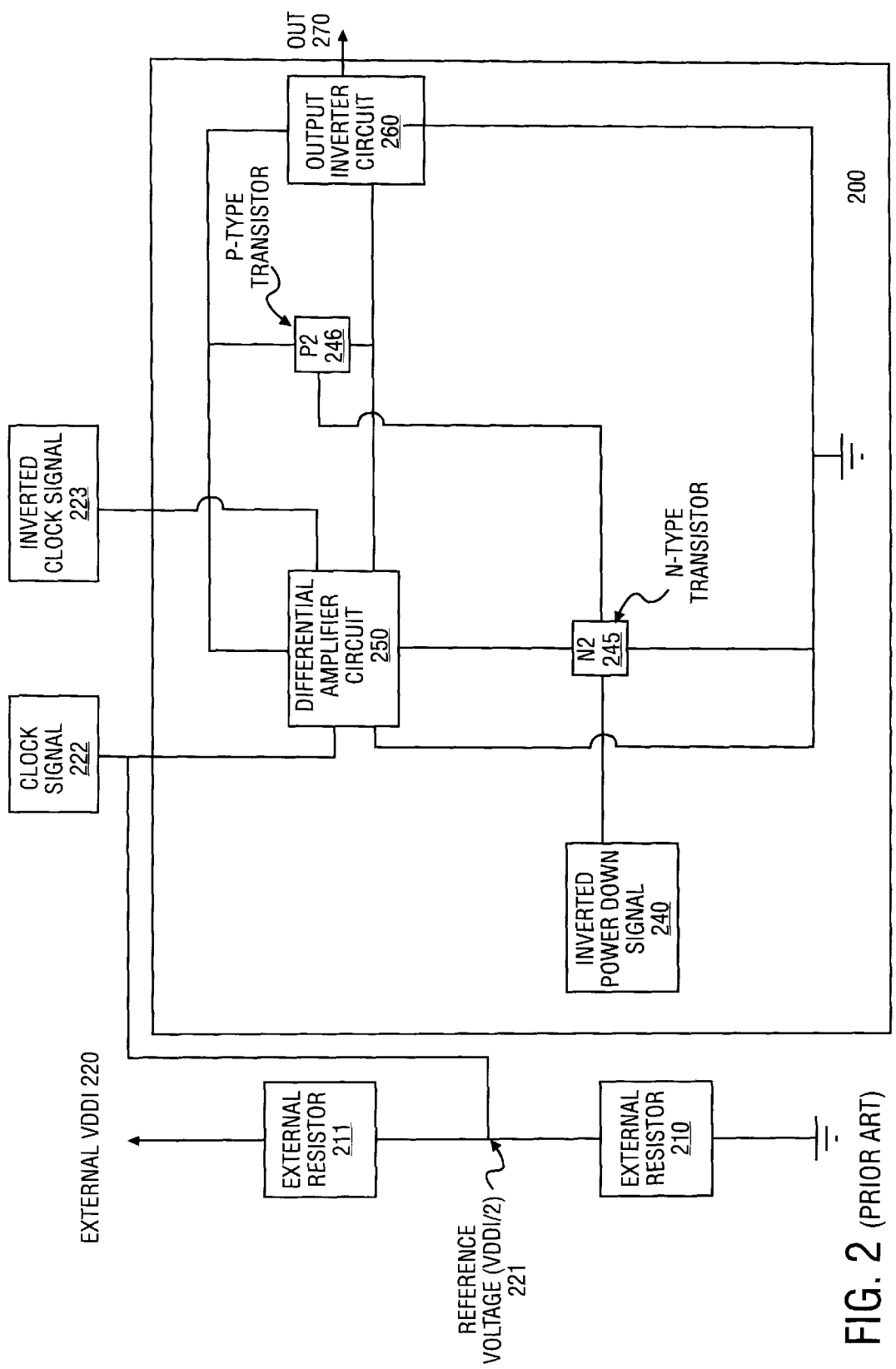
FIG. 2 illustrates a conventional differential circuit used with a single-ended input.

FIG. 2 illustrates one embodiment of a conventional differential circuit used with a single-ended input 200 known in the prior art. The differential circuit 200 includes a differential amplifier circuit 250, an internal control signal 240, n-type transistor 245 coupled to a p-type transistor 246, and an output inverter circuit 260. The differential amplifier circuit receives a single-ended clock signal versus a VDDI/2 external reference voltage 221 from the two resistors and an inverted clock signal 223. As illustrated in FIG. 2, the prior art shows the reference voltage being generated external to the circuit 200. The output of the differential circuit is determined by an internal control signal 240. The inverted power down signal 240 is sent to the n-type transistor 245 and the p-type transistor 246. The inverted power down signal 240 turns n-type transistor 245 and p-type transistor 246 on or off. The transistors 245 and 260 are couple to the output inverter circuit 260. The output inverter circuit 260 is enabled to send an output signal 270 to the rest of the circuit depending upon the state of the transistors 245 and 246.

The following is a truth table describing one embodiment of a conventional differential circuit 200 known in the prior art (shown in FIG. 2).

| CASE | PDWN# | N2 | P2 | OUT |
| --- | --- | --- | --- | --- |
| A | 0 | OFF | ON | LOW |
| B | 1 | ON | OFF | Enabled |

Case B illustrates the situation of enabling an output signal described below, and those skilled in the art will be able to better understand the present invention by following the truth table.

When an inverted power down control signal 240 (PDWN#) is 1 (circuit/differential amplifier enabled), a n-type transistor 245 (N2) is in state of on while a p-type transistor 246 (P2) is in a state of off. Since an output 270 (OUT) is enabled, a differential clock signal 140 (shown in FIG. 1) is sent transmitted through an output inverter circuit 260 and sent out 270.

The differential signal input buffer 200 can facilitate a single-ended and a differential signal input, however, the prior art circuit 200 has limitations regarding single-ended signals based, at least in part, on a signal swing. Since the external reference voltage 220 relies upon the external resistors 210 and 211, there may be variations in the external signals relative to the internal circuitry of the differential circuit 200. Additionally, due to the limitations regarding single-ended signals through the differential signal input buffer circuit 200, in order to facilitate the selection between a single-ended and a differential signal, receivers on printed circuit boards need to be physically changed.

Figure 3:
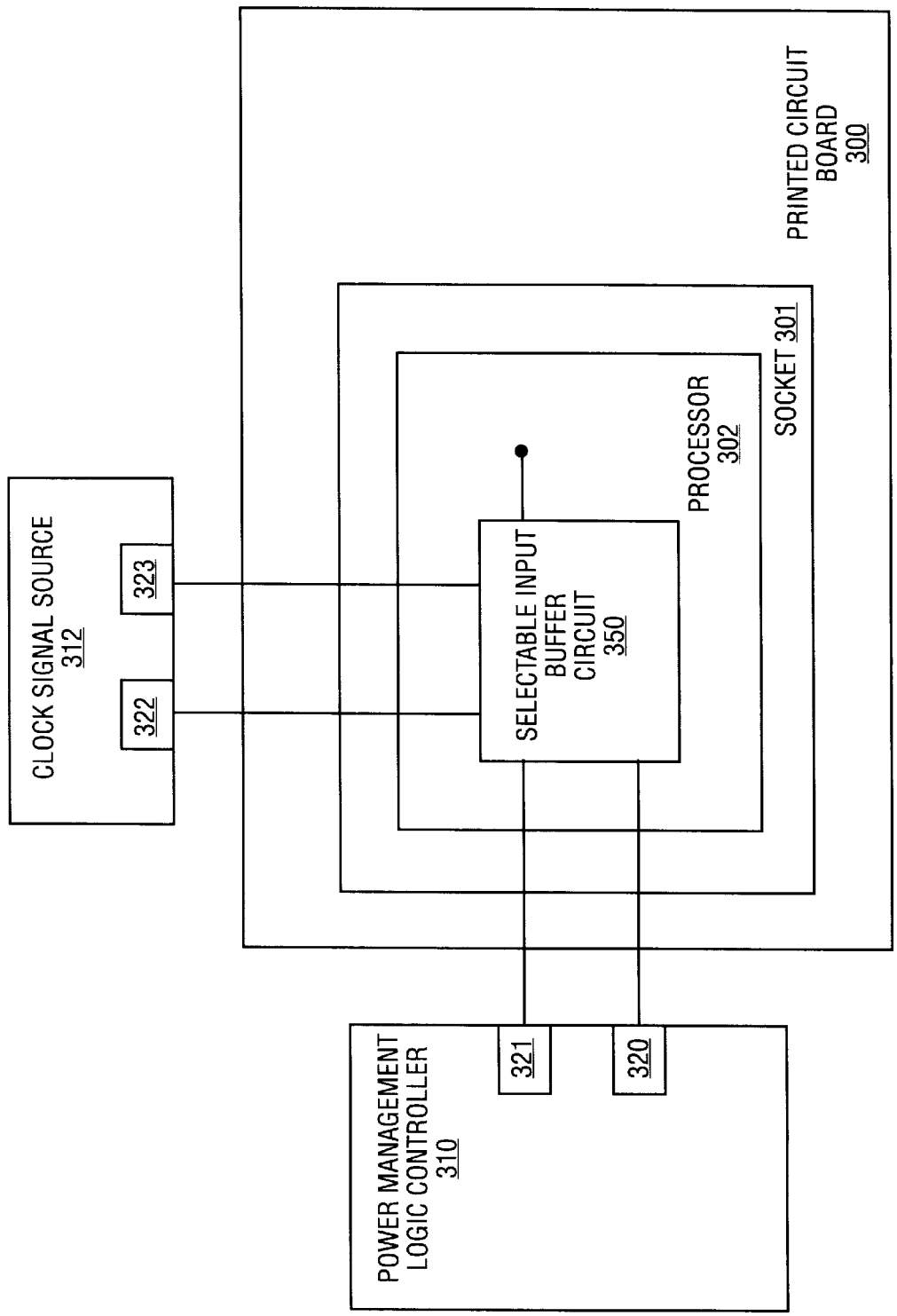
FIG. 3 illustrates a printed circuit board incorporating one embodiment.

FIG. 3 illustrates a printed circuit board (PCB) 300 upon which an embodiment of the present invention can be implemented. The PCB 300 includes a socket 301 that accepts a processor 302. FIG. 3 shows an example of the present invention implemented on a single processor 302. However, it is understood that the present invention may be implemented in a PCB having one or more multiple processor or non-processor electronic components.

The processor 302 includes a selectable input buffer circuit 350 that receives external signals 322–323 and processes the signals to output either a single-ended or a differential signal for the processor 302 to execute commands. The selectable input buffer circuit 350 is coupled to a complementary signal source 312. In one embodiment of the present invention, the complementary signal sources is a clock signal source 312 to receive a clock signal 322 and an inverted clock signal 323 selecting the type of signal the selectable input buffer circuit 350 will output for transmission to the processor 302 (i.e., single-ended or differential). Further illustrated embodiment, the selectable input buffer circuit 350 is coupled to a power management logic controller 310 to receive control input signals, an inverted differential signal 321 and an inverted power down signal 320. The inverted differential signal 321 and the inverted power down signal 320 facilitate the selection between the single-ended and differential signal output.

FIG. 3 shows an example of the present invention receiving control signals 320 and 321 from a power management logic controller 310. However, it is understood that the present invention may be implemented in a PCB receiving control signals from a variety of control devices that transmit control signals. Additionally, FIG. 3 shows an example of the present invention receiving clock signals 322 and 223 from a clock signal source 312. However, it is understood that the present invention may be implemented in a PCB receiving alternative forms of data signals.

Figure 4:
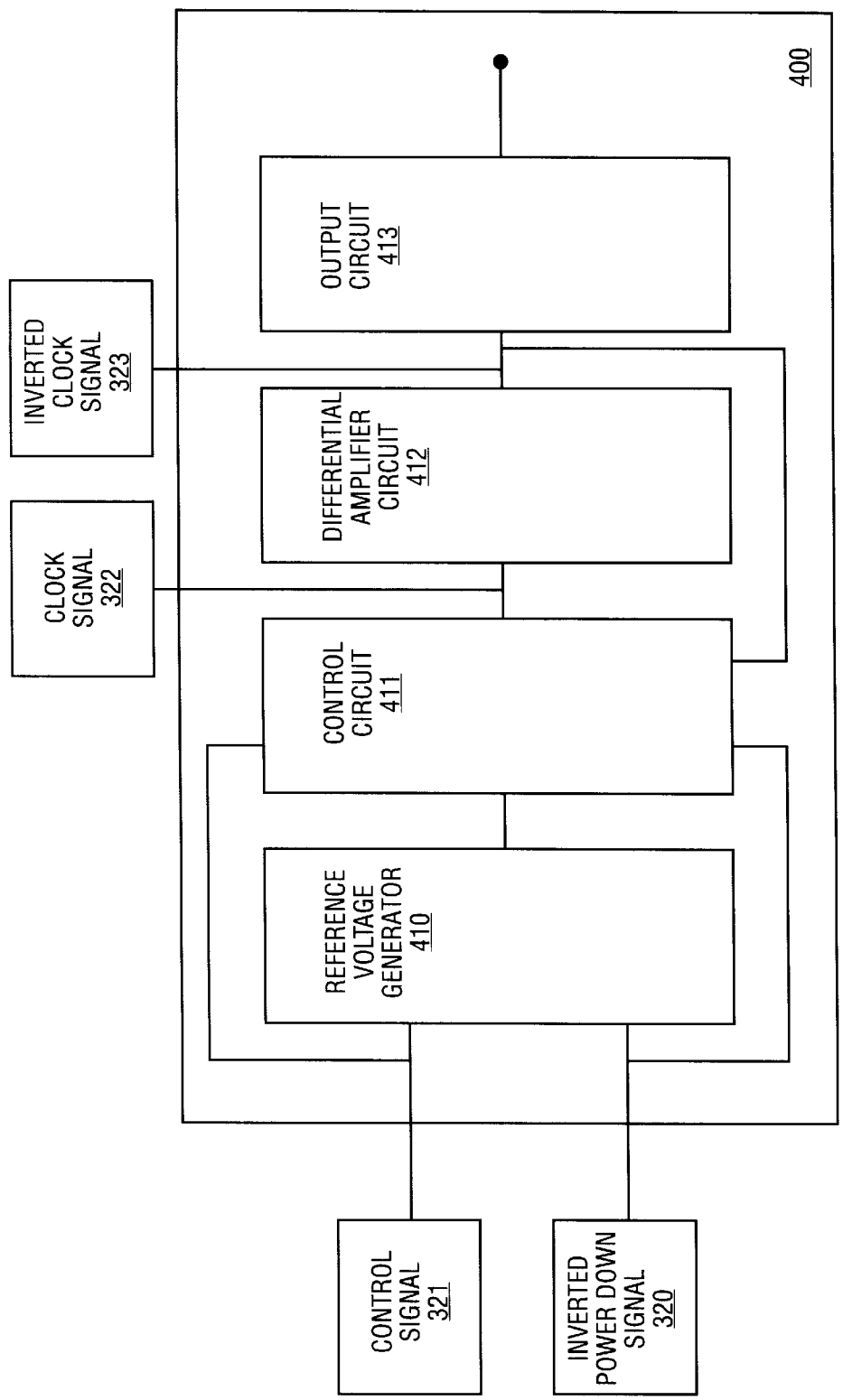
FIG. 4 illustrates one embodiment implemented on an integrated circuit.

FIG. 4 illustrates one embodiment of the present invention implemented on an integrated circuit 400. The integrated circuit 400 includes a reference voltage generator circuit 410 to receive control signals 320 and 321. The integrated circuit 400 includes a differential amplifier circuit 412 to generate a differential signal 140 (shown in FIG. 1) from the complementary signals, a clock signal 322 and an inverted clock signal 323, and send the differential signal to an output circuit 413. As described more fully below, based on at least one of the control signals 320 and 321, control circuit 411 dynamically configures the reference voltage generator circuit 410 and differential amplifier circuit 412 to send a signal to an output circuit 413 based on one of the input signals 322 and 323 (single-ended) or both signals 322 and 323 (differential). The integrated chip further includes an output circuit 413 to process the selected signal for transmission to the rest of the processor 302.

In the illustrated embodiment, the present invention is implemented on a single integrated circuit 400. However, it is understood that the present invention may be implemented on more than one PCB.

Although the invention is not limited in scope in this respect, interface circuitry may be employed in association with a signal bus, for example, for operation in either a desktop personal computer or a server configuration. To obtain speeds that may be desirable for computer applications, differential signaling, as previously described, may be employed. However, as previously indicated, components that use slower single-ended signals cannot be integrated with the faster differential signal components. The present invention allows for interchangeability between single-ended and differential signaling while maintaining the reference voltages internal to the circuit. Additionally, if selected, the present invention allows for faster differential input circuits to be driven by single-ended (slower) signals. Facilitation of selecting between a single-ended and a differential signal can occur without the need to physically change the receivers on a printed circuit board.

Figure 5:
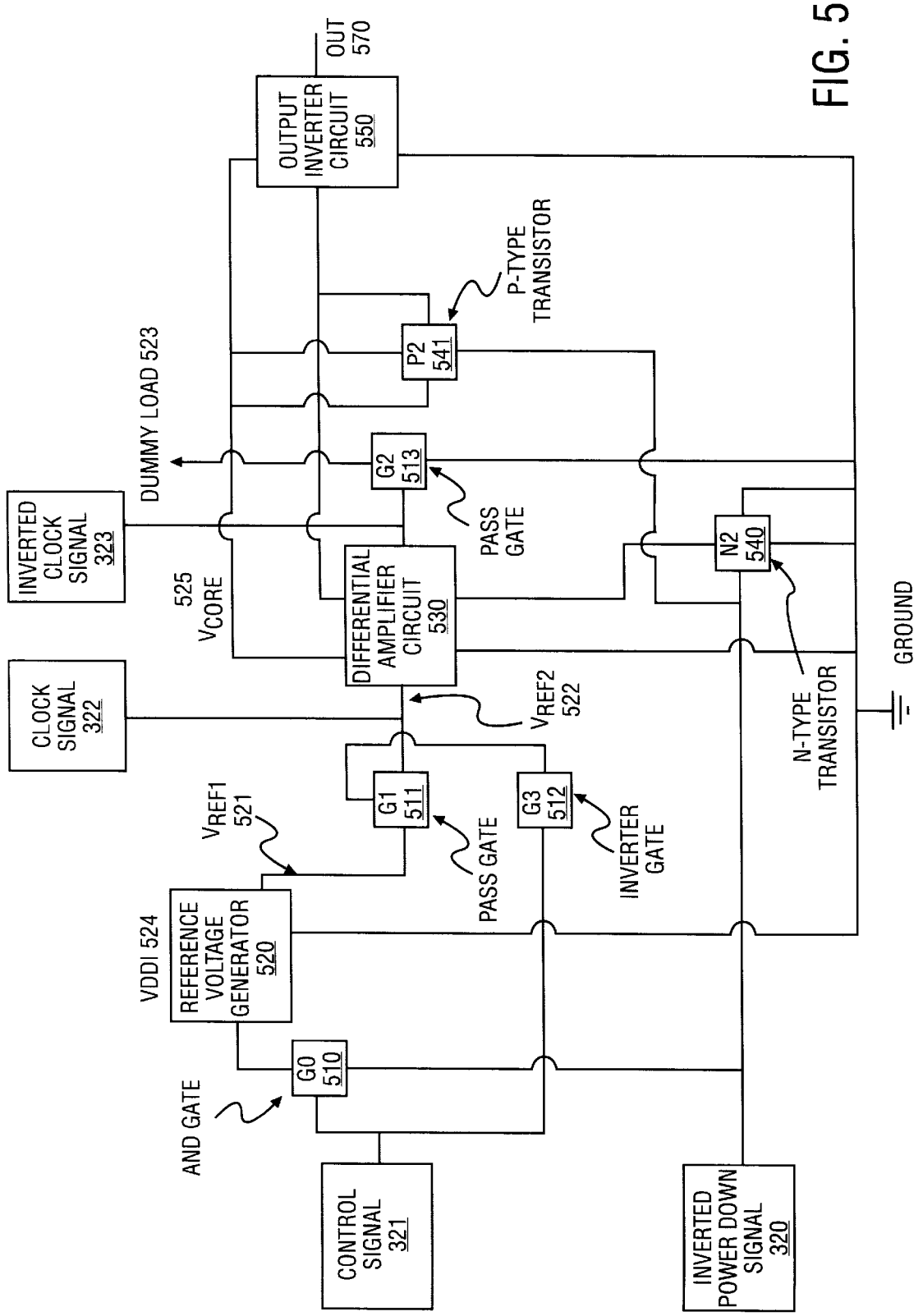
FIG. 5 illustrates a block diagram of one embodiment of a input buffer.

FIG. 5 is a block diagram of one embodiment of the selectable input buffer 350 (shown in FIG. 3) in more detail. The control circuit 411 includes gates 511–513. An AND gate 510 is coupled to external control signals, an input selection signal, differential or single-ended. In one embodiment of the present invention, the input selection signal is an inverted differential signal 321 and the other control signal is an inverted power down signal 320. The AND gate 510 receives the external signals from the external control signals 320 and 321 and selects which signal to transmit. A reference voltage generator 520 is coupled to the AND gate 510. The reference voltage generator 520 receives the signal (if one is selected for transmission by the AND gate 510) and divides a reference voltage VDDI 524. The reference voltage generator 520 is coupled to a pass gate 511. The pass gate 511 is also coupled to an inverter gate 512, and in turn, the inverter gate 512 is also coupled to the external control signal 321. The inverter gate 512 inverts the external control signal 321 and transmits the inverted external control signal to the pass gate 511 to open or close the pass gate 511.

The pass gate 511 is coupled to a differential amplifier circuit 530 and a clock signal 322. If a differential signal is selected, the differential amplifier circuit 530 generates a differential signal from the clock signal 322 and the inverted clock signal 323. The differential amplifier circuit 530 is also coupled to a second reference voltage Vcore 525, second pass gate 513 attached to a dummy voltage load 523, and the output inverter circuit 550. If a single-ended signal is selected, the inverted clock signal 323 will be transmitted to the inverter circuit 550.

The following is a truth table describing one embodiment of the present invention (shown in FIG. 5).

| CASE | PDWN# | DIFF# | G0 | VREF1 | G1 | VREF2 | N2 | P2 | OUT |
| --- | --- | --- | --- | --- | --- | --- | --- | --- | --- |
| A | 0 | 0 | L | VDDI | CLOSED | CLK | OFF | ON | LOW |
| B | 0 | 1 | L | VDDI | OPEN | VDDI (float CLK) | OFF | ON | LOW |
| C | 1 | 0 | L | VDDI | CLOSED | CLK | ON | OFF | Enabled |
| D | 1 | 1 | H | ≈VDDI/2 | OPEN | ≈VDDI/2 (float CLK) | ON | OFF | Enabled |

Case D illustrates the situation of selecting a single-ended signal with the output enabled described below, and those skilled in the art will be able to better understand the present invention by following the truth table.

When an inverted power down control signal 320 (PDWN#) is 1 (circuit active/enabled) and an inverted differential control signal 321 (DIFF#) is 1 (single-ended), an AND gate 510 (G0) is high activating a reference voltage generator 520 allowing a VREF1 521 to be approximately VDDI/2. The inverted differential control signal 321 (DIFF#) is inverted by an inverter gate 512 (G3) causing a pass gate 511 (G1) to be in a state of open allowing a VREF2 522 to be approximately VDDI/2, thereby floating a clock input signal 322. The inverted power down control signal 320 (PDWN#) causes a n-type transistor 540 (N2) to be in a state of on while the corresponding p-type transistor 541 (P2) is in a state of off. The signal from the differential amplifier circuit 530 will be an inverted clock signal 323, and the inverted clock signal 323 will be inverted by the output inverter circuit. Since the output signal 570 (OUT) is enabled in the present case, a non-inverted clock signal 323 will be transmitted out of the selectable input buffer circuit 350.

Cases A–C illustrates alternative conditions and the outcomes of the present invention.

Figure 6:
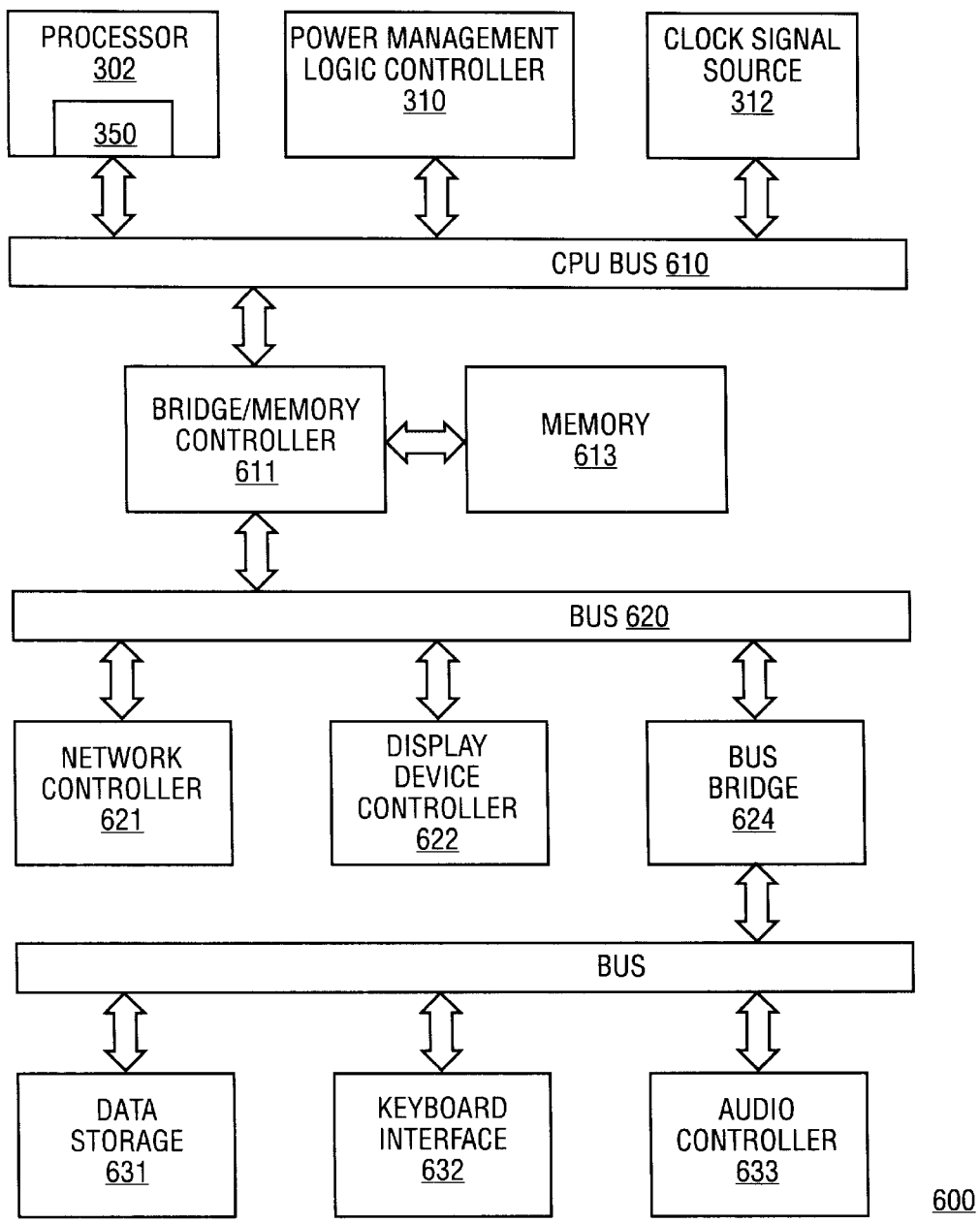
FIG. 6 illustrates a computer system incorporating one embodiment.

FIG. 6 illustrates a computer system 600 upon which an embodiment of the present invention can be implemented. The computer system 600 includes a processor 601 that processes data signals. The processor 302 (shown in FIG. 3) may be a complex instruction set computer (CISC) microprocessor, a reduced instruction set computing (RISC) microprocessor, a very long instruction word (VLIW) microprocessor, a processor implementing a combination of instruction sets, or other processor device. FIG. 6 shows an example of the present invention implemented on a single processor computer system 600. However, it is understood that the present invention may be implemented in a computer system having multiple processors. The processor includes a selectable input buffer circuit 350. The selectable input buffer circuit processes signals sent to the processor 302. The processor 302 is coupled to a CPU bus 610 that transmits data signals between processor 302 and other components in the computer system 600.

A power management logic controller 310 is coupled to the CPU bus 610. The power management logic controller 310 sends control signals to the processor 302.

A clock signal source 312 is coupled to the CPU bus 610. The clock signal source sends clocking signals to the processor 302.

The computer system 600 includes a memory 613. The memory 613 may be a dynamic random access memory (DRAM) device, a synchronous direct random access memory (SDRAM) device, or other memory device. The memory 613 may store instructions and code represented by data signals that may be executed by the processor 302.

A bridge/memory controller 611 is coupled to the CPU bus 610 and the memory 613. The bridge/memory controller 611 directs data signals between the processor 302, the memory 613, and other components in the computer system 600 and bridges the data signals between the CPU bus 610, the memory 613, and a first I/O bus 620.

The first I/O bus 620 may be a single bus or a combination of multiple buses. As an example, the first I/O bus 620 may comprise a Peripheral Component Interconnect (PCI) bus, a Personal Computer Memory Card International Association (PCMCIA) bus, a NuBus, or other buses. The first I/O bus 620 provides communication links between components in the computer system 600. A network controller 621 is coupled to the first I/O bus 620. The network controller 621 links the computer system 600 to a network of computers (not shown in FIG. 6) and supports communication among the machines. A display device controller 622 is coupled to the first I/O bus 620. The display device controller 622 allows coupling of a display device (not shown) to the computer system 600 and acts as an interface between the display device and the computer system 600. The display device controller 622 may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 302 through the display device controller 622 and displays the information and data signals to the user of the computer system 600.

A second I/O bus 630 may be a single bus or a combination of multiple buses. As an example, the second I/O bus 630 may comprise a PCI bus, a PCMCIA bus, a NuBus, an Industry Standard Architecture (ISA) bus, or other buses. The second I/O bus 630 provides communication links between components in the computer system 600. A data storage device 631 is coupled to the second I/O bus 630. The data storage device 631 may be a hard disk drive, a floppy disk drive, a CD-ROM device, a flash memory device or other mass storage device. A keyboard interface 632 is coupled to the second I/O bus 630. The keyboard interface 632 may be a keyboard controller or other keyboard interface. The keyboard interface 632 may be a dedicated device or can reside in another device such as a bus controller or other controller. The keyboard interface 632 allows coupling of a keyboard (not shown) to the computer system 600 and transmits data signals from a keyboard to the computer system 600. An audio controller 633 is coupled to the second I/O bus 630. The audio controller 633 operates to coordinate the recording and playing of sounds.

A bus bridge 624 couples the first I/O bus 620 to the second I/O bus 630. The bus bridge 624 operates to buffer and bridge data signals between the first I/O bus 620 and the second I/O bus 630.

Figure 7:
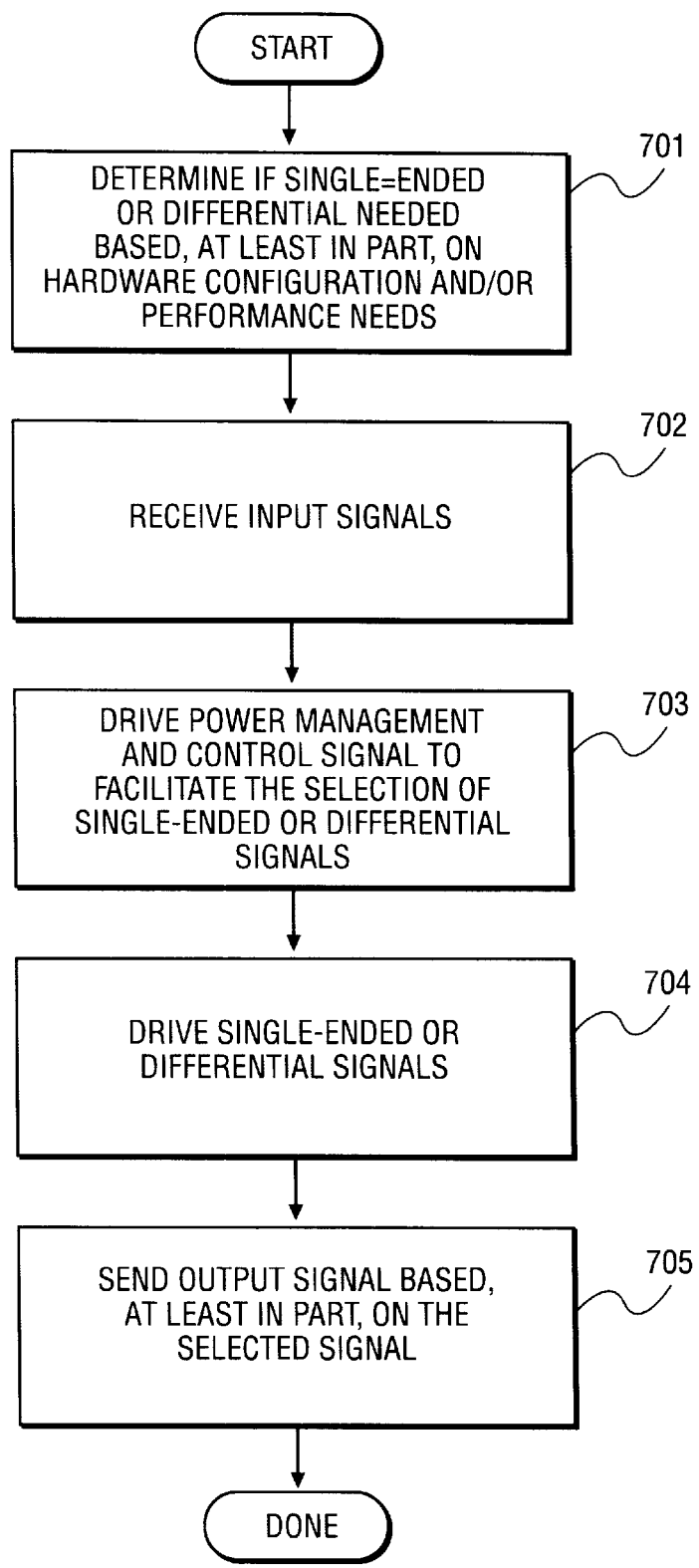
FIG. 7 illustrates a method for selecting differential and single-end signals.

FIG. 7 is a flow chart illustrating a method for dynamically selecting differential input signals and single-ended input signals according to an embodiment of the present invention. At step 701, a determination is made whether a single-ended or differential signal is needed based, at least in part, on the hardware configuration and/or the performance needs of the circuit.

At step 702, input signals are received by an reference voltage generator in a selectable input buffer circuit. According to an embodiment of the present invention, the input signals are controlled by a control circuit.

At step 703, the control signals including a power management signal is driven to facilitate the dynamic selection between single-ended and differential input signals based, at least in part, on the control signals.

At 704, once the single-ended or differential signal is selected, the selected signal is driven within the circuit.

At step 705, an output signal is generated based, at least in part, on the dynamically selected input signals.

In the forgoing description, the invention is described with reference to specific exemplary embodiments thereof. It will, however, be evident that various modifications and changes may be made thereto without departing from the broader spirit and scope of the present invention as set forth in the appended claims. The specification and the drawings are accordingly to be regarded in an illustrative rather that in a restrictive sense.

What is claimed is:

1. A method for variably providing an input signal comprising:

receiving a plurality of complementary signals;

receiving a plurality of control signals;

outputting a selected one of a single-ended and a differential signal using at least one of the received complementary signals based, at least in part, on the received control signals; and dividing a reference voltage based, at least in part, on the received control signals.

2. The method of claim 1 wherein the plurality of complementary signals further comprises:

receiving a clock input signal; and wherein outputting the selected signal comprises driving the clock input signal if the single-ended output signal is selected.

3. The method of claim 1 wherein the plurality of complementary signals further comprises:

receiving an inverted clock input signal; and wherein outputting the signal comprises driving the inverted clock input signal and the clock input signal if the differential input signal is selected.

4. The method of claim 3 wherein outputting the selected signal further comprises:

differentially amplifying the clock and inverted clock signals; and transmitting the differentially amplified signals to an output circuit.

5. The method of claim 1 wherein outputting the selected signal further comprises opening and closing a control circuit.

6. An integrated circuit for variably providing an input signal comprising:

an driver circuit to receive a plurality of complementary signals;

a control circuit to receive a plurality of control signals, the control circuit further includes a voltage divider circuit to divide a reference voltage based, at least in part, on the received control signals; and an output circuit to output a selected one of a single-ended and a differential signal using at least one of the received complementary signals based, at least in part, on the received control signals.

7. The integrated circuit of claim 6 further comprising:

a pass gate to transmit the plurality of control signals to the driver circuit; and an inverter gate to open and close the pass gate when the plurality of control signals are received.

8. The integrated circuit of claim 6 wherein the driver circuit further comprises a first pin to receive at least one of the plurality of complementary signals, wherein said one of the plurality of complementary signals is a clock input signal; and a first inverter circuit for outputting the clock input signal if the single-ended output signal is selected.

9. The integrated circuit of claim 6 wherein the driver circuit further comprises a second pin to receive at least one of the plurality of complementary signals, wherein said one of the plurality of complementary signals is an inverted clock input signal; and a differential amplifier circuit for differentially amplifying the clock and inverted clock signals if the differential signal is selected.

10. The integrated circuit of claim 6 wherein the output circuit further comprises a second inverter circuit to invert the selected input signal before outputting the selected one of the single-ended and the differential signal.

11. A system comprising:

a printed circuit board (PCB);

a system management device to generate a plurality of control signals;

a system management bus on the PCB;

a clock source to generate a plurality of complementary signals on the PCB; and a processor having a variable input signal buffer, said variable input signal buffer having:

a reference voltage regulator to receive the plurality of control signals over the system management bus;

a control circuit to receive the signals from the reference voltage generator;

a differential amplifier circuit to receive the plurality of complementary signals on the PCB; and an output circuit to output a selected one of a single-ended and a differential signal using at least on of the received complementary signals based, at least in part, on the received control signals to the PCB.

12. The system of claim 11 wherein the plurality of control signals further comprises:

an inverted differential signal; and an inverted power down signal.

13. The system of claim 11 wherein the plurality of complementary signals further comprises:

a clock signal; and an inverted clock signal.

* * * * *

UNITED STATES PATENT AND TRADEMARK OFFICE
CERTIFICATE OF CORRECTION

PATENT NO. : 6,323,699 B1
DATED : November 27, 2001
INVENTOR(S) : Quiet

It is certified that error appears in the above-identified patent and that said Letters Patent is hereby corrected as shown below:

<u>Column 6,</u>
Line 14, delete "I/O 620 bus 620" and insert -- I/O bus 620 --.

Signed and Sealed this

Eighth Day of October, 2002

Attest:

Attesting Officer

JAMES E. ROGAN
Director of the United States Patent and Trademark Office